United States Patent
Tanii et al.

(10) Patent No.: US 7,182,899 B2
(45) Date of Patent: Feb. 27, 2007

(54) MANUFACTURING METHOD OF CERAMIC ELECTRONIC COMPONENTS AND ITS MANUFACTURING EQUIPMENT

(75) Inventors: Shin Tanii, Hokkaido (JP); Yoshiya Sakaguchi, Kyoto (JP); Mitsuhiro Yamazaki, Hokkaido (JP); Toru Kitamachi, Hokkaido (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 417 days.

(21) Appl. No.: 10/433,943

(22) PCT Filed: Sep. 18, 2002

(86) PCT No.: PCT/JP02/09586

§ 371 (c)(1),
(2), (4) Date: Jun. 9, 2003

(87) PCT Pub. No.: WO03/028049

PCT Pub. Date: Apr. 3, 2003

(65) Prior Publication Data

US 2004/0046285 A1 Mar. 11, 2004

(30) Foreign Application Priority Data

Sep. 19, 2001 (JP) ............................. 2001-285440

(51) Int. Cl.
*H01G 4/30* (2006.01)
*B29C 43/30* (2006.01)

(52) U.S. Cl. .................... 264/153; 264/163; 264/255; 264/320; 83/88; 156/261; 156/264

(58) Field of Classification Search ........ 264/510–511, 264/102, 571, 153, 157–158, 160, 319, 325, 264/163, 320, 255; 83/13, 24, 88, 152; 156/261, 156/264
See application file for complete search history.

(56) References Cited

U.S. PATENT DOCUMENTS 4,435,738 A 3/1984 Barber, Jr. et al.

(Continued)

FOREIGN PATENT DOCUMENTS

DE 39 41 346 6/1990

(Continued)

OTHER PUBLICATIONS

Patent Abstracts of Japan, vol. 012, No. 020 (E-575), Jan. 21, 1988 & JP 62 177986 A (Hitachi Metals Ltd.), Aug. 4, 1987 Abstract.

*Primary Examiner*—Stefan Staicovici
(74) *Attorney, Agent, or Firm*—Wenderoth, Lind & Ponack, L.L.P.

(57) ABSTRACT

A manufacturing method for manufacturing ceramic electronic components, includes steps of forming a stack body by stacking ceramic green sheets and conductive layers on top of each other, punching a frame into the stack body and holding the frame in the stack body, locating a pressing force applying member inside the frame and, while the frame is held in the stack body, applying a pressing force to a portion of the stack body located inside the frame by causing the pressing force applying member located inside the frame to press against the portion of the stack body located inside the frame, to thereby form a high-density structure inside the frame while preventing the high-density structure from deforming outwardly beyond the frame. The stack body can be heated to reduce the required pressing force, and an elastic member may be provided to make the pressing force uniform.

12 Claims, 7 Drawing Sheets

U.S. PATENT DOCUMENTS

| | | | |
|---|---|---|---|
| 5,019,200 A | 5/1991 | Kawabata et al. | |
| 5,356,512 A * | 10/1994 | Hosokawa | 156/634 |
| 5,382,404 A | 1/1995 | Kogame | |
| 5,412,865 A | 5/1995 | Takaoka et al. | |
| 5,505,809 A * | 4/1996 | Yamamoto et al. | 156/264 |
| 5,567,240 A * | 10/1996 | Kogame et al. | 118/665 |
| 6,729,213 B1 * | 5/2004 | Baba et al. | 83/13 |

FOREIGN PATENT DOCUMENTS

| | | |
|---|---|---|
| EP | 0 530 052 | 3/1993 |
| EP | 1 158 549 A1 | 11/2001 |
| JP | 03-297117 | 12/1991 |
| JP | 04-206808 * | 7/1992 |
| JP | 05-006844 | 1/1993 |
| JP | 05-062860 | 3/1993 |
| JP | 5-175072 | 7/1993 |
| JP | 08-064465 * | 3/1996 |
| JP | 09-104018 * | 4/1997 |
| JP | 10-112420 | 4/1998 |
| JP | 11-233690 * | 8/1999 |
| JP | 2001-023844 | 1/2001 |
| JP | 2001-189228 | 7/2001 |
| JP | 2001-196258 | 7/2001 |
| JP | 2001-237139 | 8/2001 |

* cited by examiner

MANUFACTURING METHOD OF CERAMIC ELECTRONIC COMPONENTS AND ITS MANUFACTURING EQUIPMENT

TECHNICAL FIELD

The present invention relates to a method of manufacturing ceramic electronic components such as a multilayer ceramic capacitor and the like, and manufacturing equipment therefor.

BACKGROUND ART

Many methods for manufacturing ceramic electronic components have been known and a description is made here of a typical method of manufacturing multilayer ceramic capacitors.

First, a powder of such dielectric materials as barium titanate and the like is added with an organic binder, plasticizer, solvent and the like and the resulting mixture is kneaded and made into a slurry. Then, the slurry is coated using a doctor blade method or the like and dried to produce a ceramic green sheet. Next, a conductive paste mainly composed of a metal is printed on the ceramic green sheet by a screen printing method or the like and dried to form a conductive layer, thereby allowing an active layer sheet to be prepared. Aside from above, a cover layer sheet composed only of a ceramic green sheet, which has no conductive layer formed thereon, is prepared.

Figure 12:
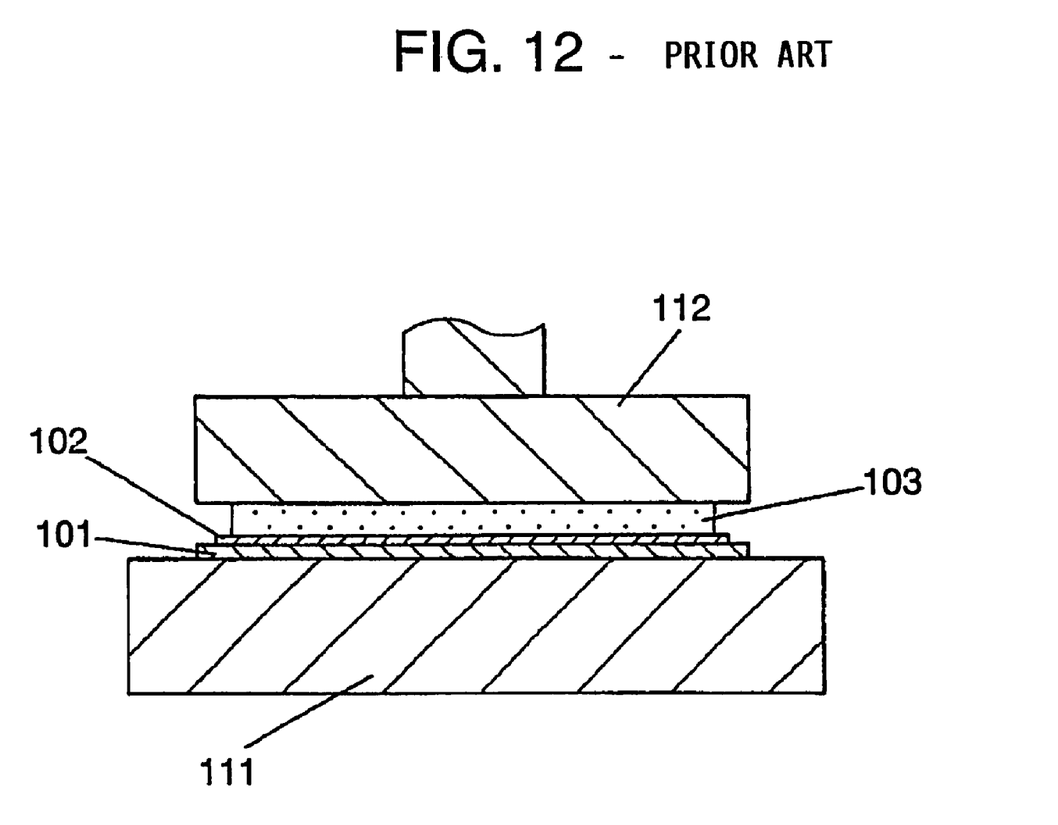
FIG. 12 is a cross-sectional view for describing a step of applying a pressing force to a stack body to form a high-density structure according to a prior art technology.

As FIG. 12 shows, according to a prior art process of stacking multilayer ceramic capacitors, adhesive layer 102 is disposed on supporting plate 101 and a plurality of cover layer sheets are stacked thereon. Further, on top of that, an active layer sheet is superimposed, thus putting together a ceramic green sheet and a conductive layer to form a stack structure. The step of superimposing an active layer sheet is repeated a predetermined number of times and further a plurality of cover layer sheets are again stacked on top of the plurality of active layer sheets to realize stack body 103. When the active layer sheets are stacked on top of each other, the stacking is performed in such a manner that a plurality of rectangular patterns of respective conductive layers, each acting as an internal electrode, are staggered alternately from layer to layer by a predetermined distance in the length direction of the rectangular pattern.

In the step of forming a high-density structure by pressing, a pressing force is applied to stack body 103 to have respective ceramic green sheets and conductive layers pressed against one another to form a one-piece structure. In the prior art step of forming a high-density structure by pressing, a uniaxial press with flat lower die 111 and flat upper die 112 arranged in parallel with each other is used. Stack body 103 as composed on supporting plate 101 via adhesive layer 102 is disposed on lower die 111 and a pressing force is applied via upper die 112 to form a high-density structure of stack body 103.

Next, the high-density structure of stack body 103 is cut into pieces, each having a desired configuration, and separated from adhesive layer 102 on supporting plate 101, to produce green chips. The green chips are sintered and external electrodes are provided on each respective chip to complete a multilayer ceramic capacitor.

The aforementioned step of forming a high-density structure by pressing is a very important step to prevent a failure due to structural defects such as delamination and the like from occurring. When the extent of adhesive joining between respective ceramic green sheets and conductive layers is insufficient, it is likely to cause a failure due to structural defects. Therefore, in order to establish the densifying condition to a sufficient extent, it is necessary for a pressing force to be uniformly and sufficiently applied to stack body 103, thereby allowing respective ceramic green sheets to be deformed in the thickness direction thereof and to be pressed against each other to realize an excellent density condition.

However, when a ceramic green sheet has a pressing force applied thereto or is exposed to a temperature and a pressure needed for densifying, the ceramic green sheet is deformed not only in the thickness direction thereof but also in the direction parallel to the surface thereof. This means that the periphery of stack body 103 tends to expand outwards, thereby causing a distortion in the shape of the conductive layer. As a result, when stack body 103 is cut into pieces, a failure due to disconnection and a failure due to poor characteristics are caused. These problems are likely to be multiplied as the step-wise difference in level due to missing of a conductive layer is increased because increasing numbers of the conductive layers are involved and/or the thickness of a ceramic green sheet is small, thereby making the ratio of the thickness of conductive layers occupying in the thickness of stack body 103 more significant.

Therefore, various proposals have been made with respect to a method for preventing the deformation of a stack body from occurring when a pressing force is applied thereto. For example, in the Japanese Patent Application Unexamined Publication Nos. H5-175072 and 2001-23844, disclosed methods include:

A) a method for forming a high-density structure by first applying a pressing force to the periphery on the surface of a stack body by means of a peripheral section die and then applying a pressing force to the inner part below the surface of the stack body by means of a central section die;

B) a method for applying a higher pressing force to a stack body by means of a peripheral section die than the pressing force applied to the stack body by means of a central section die; and C) a method for applying a pressing force to a stack body placed in an elastic framework by means of a uniaxial rubber press.

Even according to the methods A and B, however, when the step-wise difference in level due to missing of a conductive layer is large, a plastic deformation of a ceramic green sheet takes place not only in the thickness direction but also in the direction parallel to the surface of the ceramic green sheet. As a result, the stack body expands at the outer periphery thereof to cause a distortion in the shape of the conductive layer.

Even according to the method C, it is necessary for the dimensions of the stack body to match the inner dimensions of the elastic framework with a high degree of precision and even a little difference in the dimensions allows the deformation of the stack body to occur.

SUMMARY OF THE INVENTION

A manufacturing method of ceramic electronic components according to the present invention comprises the step of applying a pressing force to a stack body formed by stacking ceramic green sheets and conductive layers on top of each other alternately to form a one-piece high-density structure of ceramic green sheets and conductive layers, in which a frame is installed to be held inside the stack body and a pressing force is applied to a pressing force applying member located inside of the frame. Manufacturing equipment of ceramic electronic components according to the present invention comprises a lower die, a pressing force applying member and a frame provided to surround the outer periphery of the pressing force applying member for applying a pressing force to a stack body formed by stacking ceramic green sheets and conductive layers on top of each other alternately, in which the tip of the frame is shaped like a blade.

DETAILED DESCRIPTION OF THE INVENTION

Next, a description is given to various exemplary embodiments of the present invention with reference to the drawings. With respect to descriptions made of objects structured in a manner similar to one another, the same reference symbols are used in common.

Exemplary Embodiment 1

A description is made of exemplary embodiment 1 with reference to FIG. 1 through FIG. 5.

First, ceramic green sheet 3 composed of a ceramic powder, which is mainly formed of barium titanate, and an organic binder is formed on a base film to prepare a first sheet. Meanwhile, a second sheet is prepared by having conductive layer 4 deposited on ceramic green sheet 3. This process is performed according to a screen printing method by the use of a metallic paste mainly composed of nickel to form conductive layer 4 on ceramic green sheet 3 of the first sheet in a desired pattern, and is followed by a drying step. At this time, the thickness of ceramic green sheet 3 is made about 10 μm and the thickness of conductive layer 4 is made about 2.5 μm.

Figure 5:
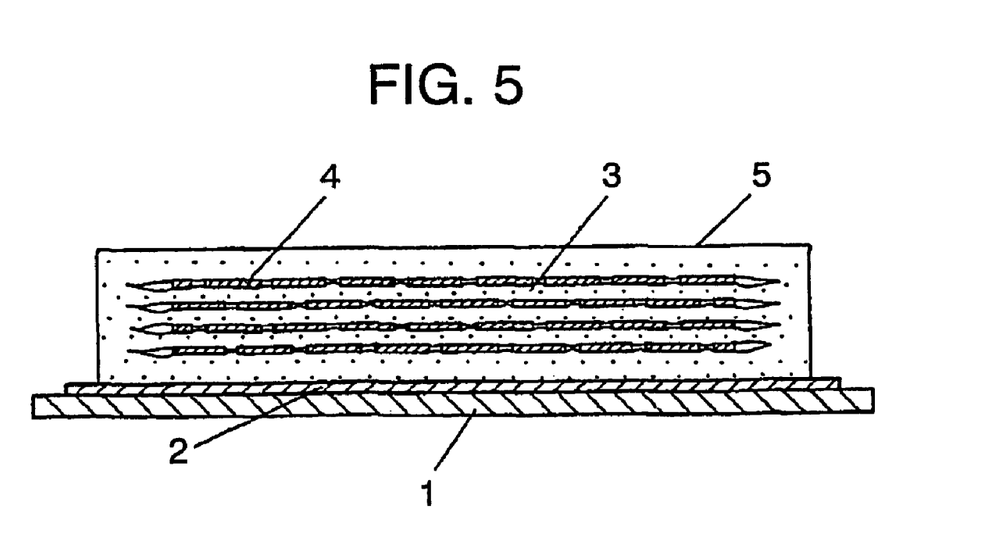
FIG. 5 is a cross-sectional view of a stack body in exemplary embodiment 1 of the present invention.

Next, a stacking process is described. As FIG. 5 shows, adhesive sheet 2 is first formed on supporting plate 1. Adhesive sheet 2 plays an important role in making supporting plate 1 integral with stack body 5 and has adhesion to both stack body 5 and supporting plate 1. The adhesion is strong enough to prevent stack body 5 and supporting plate 1 from coming off from each other. However, when the integral structure of stack body 5 and supporting plate 1 is cut into pieces, it is necessary for the composing elements of each respective piece to be separated from each other. Therefore, the adhesion between stack body 5 and supporting plate 1 is arranged to disappear when heated to temperatures higher than a predetermined temperature.

Then, after the first sheet is transfer printed by bonding on top of adhesive sheet 2 on supporting plate 1 by an application of heat and pressure via the base film, the base film is eliminated by peeling off. This process is repeated to have 20 sheets of the first sheet stacked on top of each other, resulting in a cover layer.

Subsequently, after the second sheet is transfer printed by bonding on top of the cover layer by placing the second sheet on the cover layer in such a manner as that side of conductive layer 4 touches the cover layer and applying heat and pressure via the base film, the base film is eliminated by peeling off. This process of transfer printing the second sheet by bonding is repeated 150 times.

Additionally, 20 sheets of the first sheet are stacked on top of each other to form a cover layer on the stacked second sheets, thus obtaining stack body 5 as shown in FIG. 5.

Figure 4:
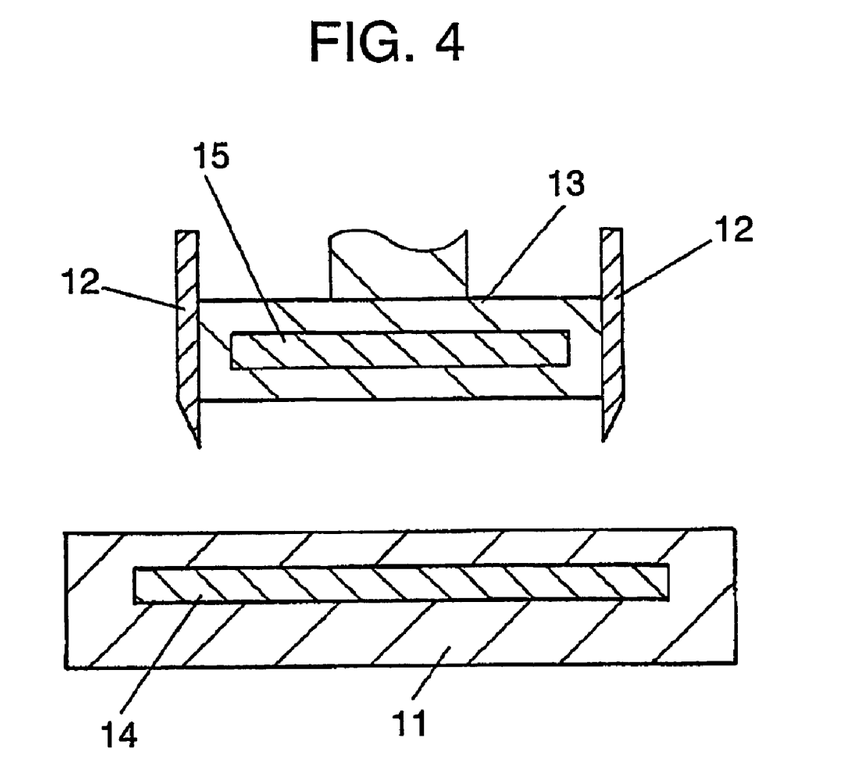
FIG. 4 is a cross-sectional view of manufacturing equipment for manufacturing ceramic electronic components, used in the step of applying a pressing force to a stack body to form a high-density structure in exemplary embodiment 1 of the present invention.

Next, the manufacturing equipment as shown in FIG. 4 is described. Frame 12 of the manufacturing equipment is provided so as to surround the outer periphery of pressing force applying member 13 with almost no gaps left therebetween. In order for frame 12 to have the function of cutting stack body 5, the surface of frame 12 at the side of pressing force applying member 13 is aligned in parallel to the side surface of pressing force applying member 13 and the tip of frame 12 is shaped like a sharp blade which is angled outwardly. Heaters 14 and 15 are buried in lower die 11 and pressing force applying member 13, respectively, for heating an object to be pressed. In order to secure the object to be pressed, lower die 11 has a suction function for fixing the object to be pressed by suction.

Next, a step of forming a high-density structure by pressing is described with reference to FIG. 1 through FIG. 3.

Figure 1:
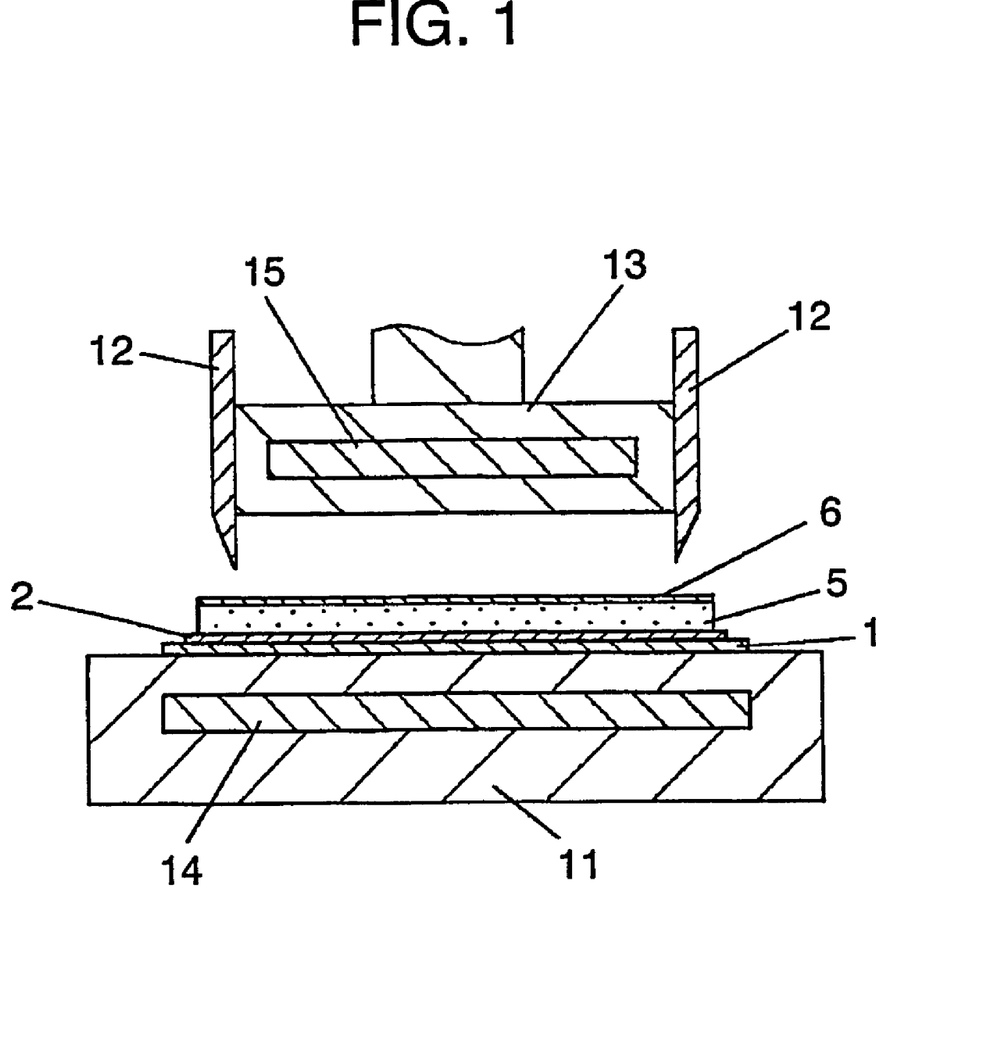
FIG. 1 is a cross-sectional view for describing a step of applying a pressing force to a stack body to form a high-density structure in exemplary embodiment 1 of the present invention.

As FIG. 1 shows, stack body 5 fixed on supporting plate 1 by means of adhesive sheet 2 is disposed on lower die 11 of the manufacturing equipment at a predetermined position. And, on the upper surface of stack body 5 is disposed a polyethyleneterephthalate film 6 (referred to as a "film", hereafter) of 35 µm thickness.

Figure 2:
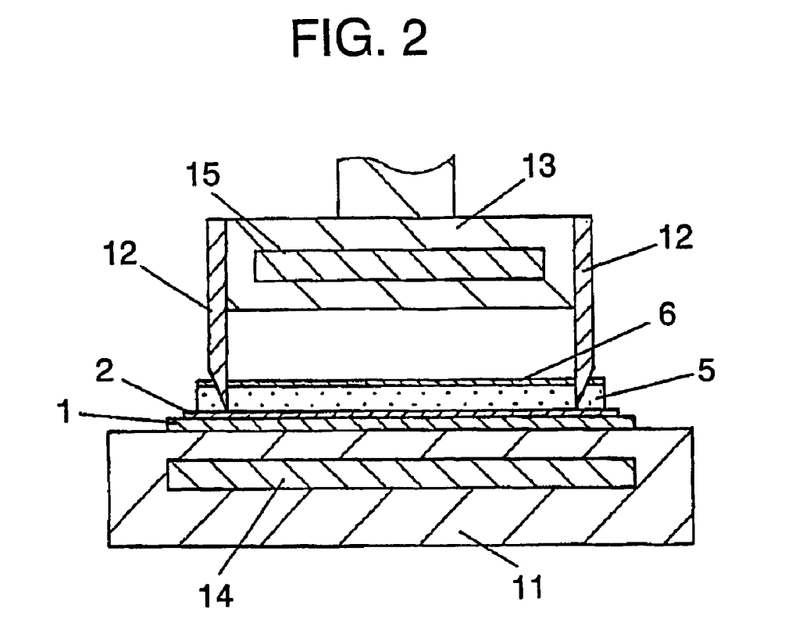
FIG. 2 is another cross-sectional view for describing the step of applying a pressing force to a stack body to form a high-density structure in exemplary embodiment 1 of the present invention.

Then, as FIG. 2 shows, frame 12 is moved down by hydraulic pressure and punched into stack body 5, and stops when the tip of frame 12 touches adhesive sheet 2. After that, pressing force applying member 13 is moved down by hydraulic pressure and presses stack body 5 inside of frame 12 as FIG. 3 shows. At this time, the temperatures of lower die 11 and pressing force applying member 13 are kept at 80° C. by heaters 14 and 15, respectively. Stack body 5 is pressed for 60 seconds under the pressure of 50 MPa.

Subsequently, the hydraulic pressure is reduced to 1 MPa while pressing force applying member 13 is stopped after moving down.

While stack body 5 is being held, frame 12 is moved up by hydraulic pressure to have frame 12 separated from stack body 5. Then, pressing force applying member 13 is moved up by hydraulic pressure to have pressing force applying member 13 separated from stack body 5.

Next, stack body 5 formed into a high-density structure by pressing is removed from lower die 11 of the manufacturing equipment together with supporting plate 1 and adhesive sheet 2, and stack body 5 is cut to the required dimensions. Afterwards, stack body 5 cut apart together with supporting plate 1 and adhesive sheet 2 is heated to 150° C. to be separated from adhesive sheet 2, thereby producing many pieces of green chips. After subjecting the green chips to a binder eliminating treatment in nitrogen gas, the green chips are sintered in a mixed atmosphere of nitrogen and hydrogen gases, in which nickel is prevented from oxidation, with the temperatures thereof increased to 1300° C., thereby obtaining sintered bodies of the chips.

Each of the sintered bodies is treated with chamfering to have the inner electrode exposed to both end surfaces thereof. After an electrode paste mainly composed of copper is applied to both end surfaces and also to side surfaces of each respective sintered body, the sintered bodies are exposed in a nitrogen atmosphere at 800° C. to form electrodes. External electrodes composed of nickel are formed on the electrodes by applying nickel plating thereto and solder is formed on nickel by applying solder plating thereto, thereby producing multilayer ceramic capacitors in exemplary embodiment 1 of the present invention.

By conducting an inspection of the internal structure of the respective multilayer ceramic capacitors produced in exemplary embodiment 1 through a microscopic observation of cross-sections of the capacitors, failures due to structural defects such as a disconnection defect caused by displacement of conductive layers, interlayer stripping, delamination and the like are not observed at all. Electrical characteristics of the multilayer ceramic capacitors are also excellent.

In the step of forming a high-density structure by pressing stack body 5 according to a method of manufacturing multilayer ceramic capacitors in exemplary embodiment 1 of the present invention, a pressing force is applied to stack body 5 by pressing force applying member 13 located inside of frame 12 while frame 12 is punched into stack body 5. Accordingly, since a pressing force is applied to stack body 5 while stack body 5 is securely held by frame 12 in such a manner that no gaps are created between frame 12 and the peripheral side surfaces of stack body 5, no deformations of stack body 5 in the directions parallel to the surface thereof are created, thereby eliminating the possibility of causing deformations of conductive layer 4 due to a strain imposed thereto and allowing stack bodies with an excellent cladding structure to be realized. As a result, when the stack bodies are fired to produce sintered bodies, ceramic electronic components produced by the use of such sintered bodies exhibit no failures due to disconnection, structural defects and defective electrical characteristics and are produced at a good yield rate.

Since heaters 14 and 15 are employed in exemplary embodiment 1 to apply a pressing force to stack body 5 while heat is applied thereto, stack body 5 is softened due to the heat application and, even when a pressing force is small in comparison with the case where a pressing force is applied at ordinary temperatures, a stack body with a sufficiently excellent cladding condition can be realized. Since the conditions for realizing a cladding structure with a pressing force application can be set up by both factors of temperature and pressing force, there is a wide range of freedom to adopt appropriate conditions for realizing a cladding structure by pressing in accordance with the properties of ceramic green sheets that constitute a stack body.

Further, a pressing force is applied to stack body 5 via film 6 disposed on the upper surface thereof, thereby preventing the pressure application surface of pressing force applying member 13 from sticking to stack body 5 to facilitate the separation from each other. In addition, the adhesion of dirt and dust to stack body 5 is prevented.

The manufacturing equipment used in exemplary embodiment 1 employs frame 12 that surrounds the outer periphery of pressure applying member 13 and the tip of frame 12 is shaped like a blade. By the use of the manufacturing equipment thus structured, it is made possible for the manufacturing method in exemplary embodiment 1 of the present invention to be put into practice, with the method featuring a pressing force being applied to stack body 5 via pressing force applying member 13 while frame 12 is pressed into stack body 5 and held securely therein.

Also, the manufacturing equipment used in exemplary embodiment 1 allows pressing force applying member 13 and frame 12 to move independently, thereby making it possible for frame 12 to appropriately adjust to the necessary extent and force of pressing thereof into stack body 5 and for pressing force applying member 13 to adjust the pressing force and the like in accordance with the thickness and properties of the object to be pressed, i.e., stack body 5.

Furthermore, since frame 12 is installed in such a manner that no gaps are left between frame 12 and pressing force applying member 13, there is no possibility for stack body 5 to get into gaps between frame 12 and pressing force member 13, thereby eliminating the cause of stack body 5 being deformed in shape at the time of applying a pressing force to stack body 5 via pressing force applying member 13.

The tip of frame 12 is shaped like a blade in such a manner that the inner surface of frame 12 at the side of pressing force applying member 13 is aligned in parallel to the side surface of pressing force applying member 13. Therefore, when frame 12 is pressed into stack body 5, no extra force is imposed to stack body 5 located at the inner side of frame 12 in the direction parallel to the surface of stack body 5, thereby preventing stack body 5 from being lifted and/or deformed.

The advantages as described above are applicable to the case where ceramic green sheets are thin and even the case where the number of ceramic green sheets and the number of conductive layers are multiplied.

Exemplary Embodiment 2

Figure 6:
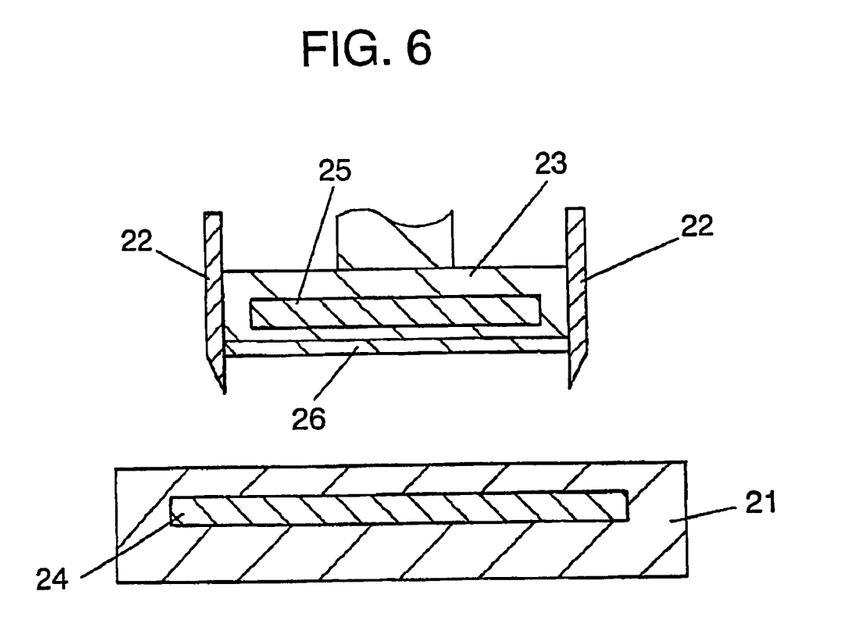
FIG. 6 is a cross-sectional view of manufacturing equipment for manufacturing ceramic electronic components, used in a step of applying a pressing force to a stack body to form a high-density structure in exemplary embodiment 2 of the present invention.

FIG. 6 is a cross-sectional view of manufacturing equipment for manufacturing ceramic electronic components employed in the step of forming a high-density structure by pressing in exemplary embodiment 2 of the present invention.

The difference between exemplary embodiment 2 and exemplary embodiment 1 is in the structure of the manufacturing equipment employed. As FIG. 6 shows, the manufacturing equipment in exemplary embodiment 2 of the present invention has the pressure application surface on the end part of pressing force applying member 23 composed of elastic body 26 to apply a pressing force uniformly to an object to be pressed. A high-temperature-resistant rubber material is employed as elastic body 26. Alternatively, a flat plate composed of a rigid body via a spring support can be used or a piston-type structure with a gas enclosed can be employed. Except for the foregoing, the manufacturing equipment in the present exemplary embodiment is the same as the one of FIG. 4 used in exemplary embodiment 1.

Next, steps of a manufacturing method for manufacturing ceramic electronic components in exemplary embodiment 2 of the present invention are described.

First, stack body 5 is prepared in the same manner as in exemplary embodiment 1.

With respect to the step of forming a high-density structure by applying a pressing force to stack body 5, the drawing for describing the step is omitted since the ascending/descending movement of frame 22 and pressing force applying member 23 at the time of forming a high-density structure by applying a pressing force to stack body 5 is similar to that shown for exemplary embodiment 1. And, the step of disposing stack body 5 on lower die 21 at a predetermined position thereof and also disposing a polyethyleneterephthalate film on the upper surface of stack body 5 is also similar to that of exemplary embodiment 1 as shown in FIG. 6.

Then, frame 22 is moved down by hydraulic pressure and pressed into stack body 5. The movement of frame 22 comes to a stop when the tip thereof touches adhesive sheet 2. Thereafter, pressing force applying member 23 of the manufacturing equipment is moved down by hydraulic pressure to press stack body inside of frame 22. At this time, heaters 24 and 25 maintain the temperatures of lower die 21 and pressing force applying member 23 at 80° C. and pressing force applying member 23 presses stack body 5 for 60 seconds with a pressing force of 30 MPa.

Subsequently, the hydraulic pressure is reduced to 1 MPa while pressing force applying member 23 is stopped after moving down. While stack body 5 is held, frame 22 is moved up by hydraulic pressure to have frame 22 separated from stack body 5. Then, pressing force applying member 23 is moved up by hydraulic pressure to have pressing force applying member 23 separated from stack body 5. Next, stack body 5 formed into a high-density structure by pressing is removed from lower die 21 together with supporting plate 1 and adhesive sheet 2.

In the same way as in exemplary embodiment 1, stack body 5 is cut apart into pieces of green chips. The green chips are sintered, and are then provided with external electrodes, thus producing multilayer ceramic capacitors in exemplary embodiment 2 of the present invention.

Upon conducting an inspection of the internal structure of the multilayer ceramic capacitors produced in exemplary embodiment 2 through a microscopic observation of cross-sections of the capacitors, failures due to structural defects such as disconnection defects caused by displacement of conductive layers, delamination and the like are not observed at all. Electrical characteristics of the multilayer ceramic capacitors are also excellent.

The manufacturing equipment in exemplary embodiment 2 of the present invention has the pressure application surface on the end part of pressing force applying member 23 provided with elastic body 26. Accordingly, the adverse effects caused by irregularities on the surface of an object to be pressed, i.e., stack body 5 due to the existence of conductive layer 4 are absorbed by elastic body 26, thereby allowing a uniform pressing force to be applied to stack body 5. The pressing force applied to stack body 5 in exemplary embodiment 2 is small in magnitude when compared with exemplary embodiment 1, resulting in an elimination of such a problem as deformations of stack body 5 and yet providing an excellent densifying condition of the stack body.

As a result, ceramic electronic components exhibiting no failures due to disconnection defects, structural defects and defective electrical characteristics are produced with a good yield rate.

Exemplary Embodiment 3

Figure 7:
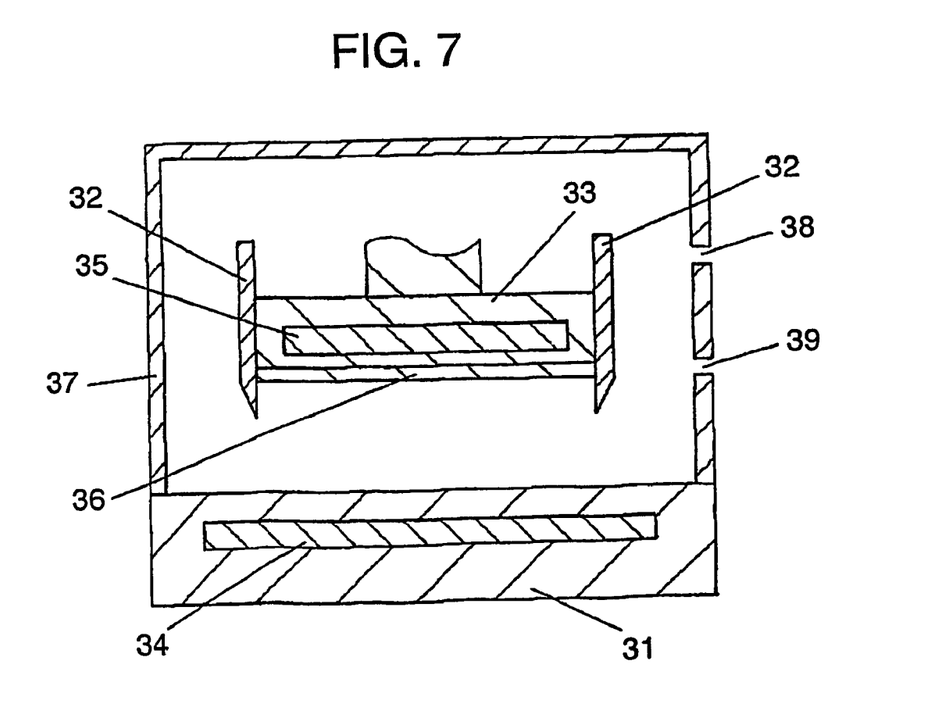
FIG. 7 is a cross-sectional view of manufacturing equipment for manufacturing ceramic electronic components, used in a step of applying a pressing force to a stack body to form a high-density structure in exemplary embodiment 3 of the present invention.

FIG. 7 is a cross-sectional view of the manufacturing equipment of ceramic electronic components employed in the step of forming a high-density structure by pressing in exemplary embodiment 3 of the present invention. FIG. 8 through FIG. 11 are cross-sectional views for describing the step of forming a high-density structure by applying a pressing force to a stack body in exemplary embodiment 3 of the present invention.

Exemplary embodiment 3 differs from exemplary embodiment 1 and exemplary embodiment 2 in the structure of the manufacturing equipment employed and the ascending/descending movement of frame 32 and pressing force applying member 33 at the time of forming a high-density structure by pressing. As FIG. 7 shows, the manufacturing equipment for manufacturing ceramic electronic components in exemplary embodiment 3 is structured to allow the space inside vacuum chamber 37 to be kept under a reduced pressure by exhausting air through air outlet 38. Accordingly, an application of a pressing force to a stack body in an atmosphere under a reduced pressure facilitates the exhaustion of gasses contained in the stack body, thereby allowing the stack body to realize an excellent densifying condition. Except for the foregoing, the manufacturing equipment in the present exemplary embodiment is structured in the same way as the manufacturing equipment of FIG. 6 used in exemplary embodiment 2.

Next, steps of a manufacturing method for manufacturing ceramic electronic components in exemplary embodiment 3 of the present invention are described.

Figure 3:
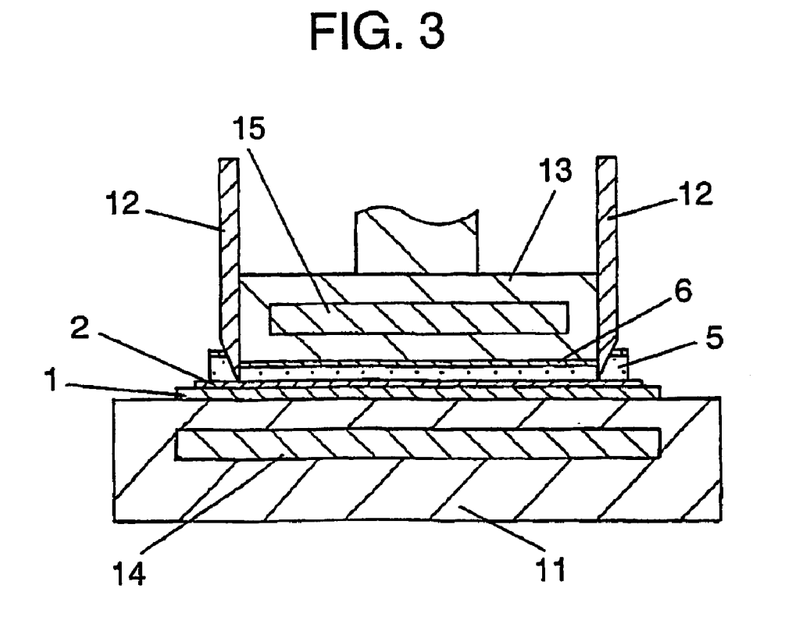
FIG. 3 is still another cross-sectional view for describing the step of applying a pressing force to a stack body to form a high-density structure in exemplary embodiment 1 of the present invention.

First, stack body 5 as shown in FIG. 3 is prepared in the same manner as in exemplary embodiment 1.

Figure 8:
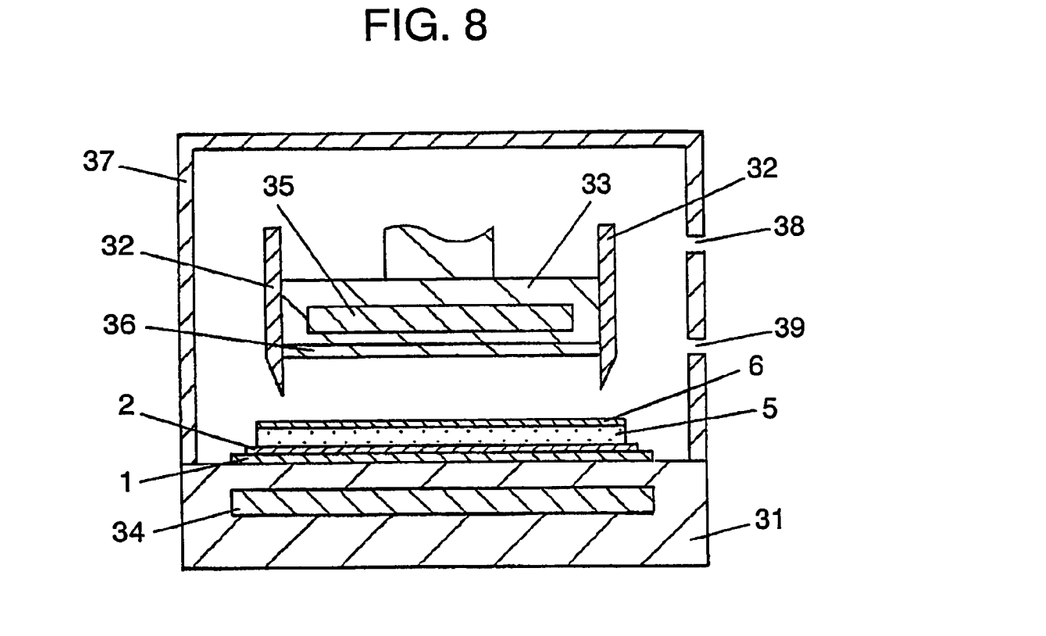
FIG. 8 is a cross-sectional view for describing the step of applying a pressing force to a stack body to form a high-density structure in exemplary embodiment 3 of the present invention.

Then, as FIG. 8 shows, stack body 5 is disposed on lower die 31 at a predetermined position and film 6 is disposed on the upper surface of stack body 5. These steps are the same as in exemplary embodiment 1. And, air is exhausted through air outlet 38 of vacuum chamber 37 to reduce the atmospheric pressure inside vacuum chamber 37 to 13 hPa, thereby allowing gasses contained inside of stack body 5 to be exhausted.

Figure 9:
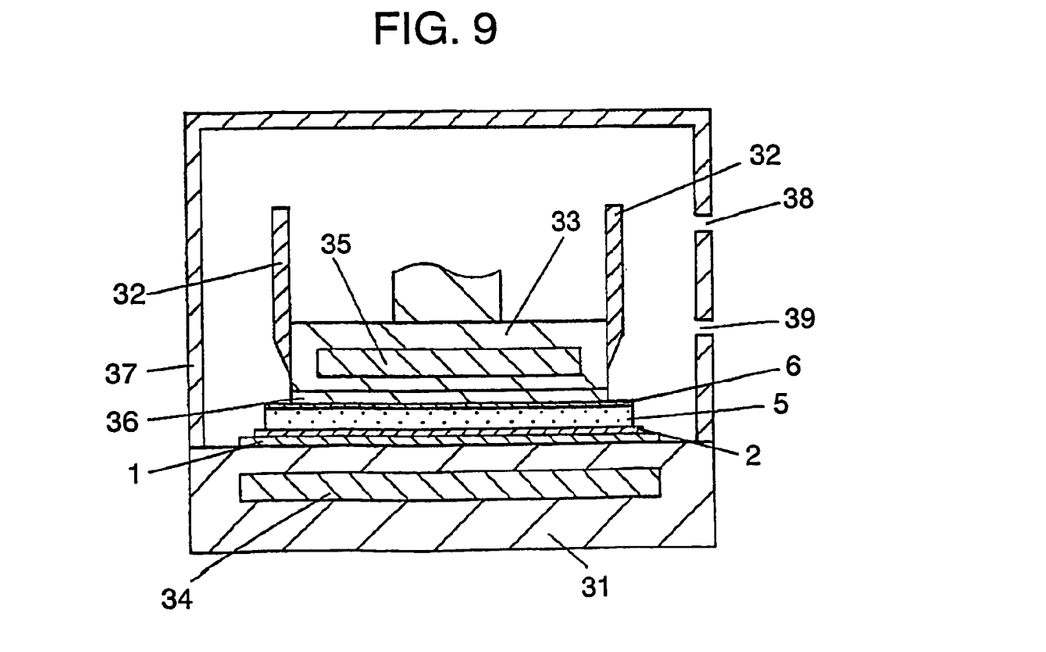
FIG. 9 is another cross-sectional view for describing the step of applying a pressing force to a stack body to form a high-density structure in exemplary embodiment 3 of the present invention.

Subsequently, while the atmospheric pressure inside of vacuum chamber 37 is kept at 13 hPa, pressing force applying member 33 of the manufacturing equipment is moved down by hydraulic pressure and stops the motion of moving down at a position where a small pressing force of 1 MPa is still being applied to stack body 5. Thus, as FIG. 9 shows, elastic body 36 attached to the end part of pressing force applying member 33 holds stack body 5 in place.

Figure 10:
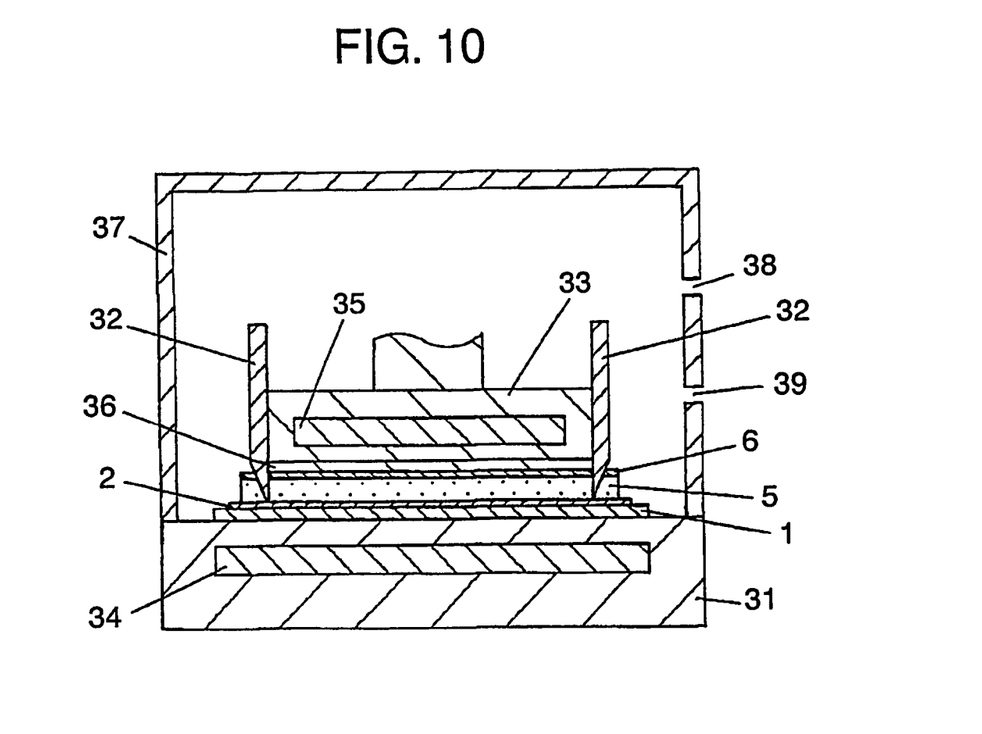
FIG. 10 is still another cross-sectional view for describing the step of applying a pressing force to a stack body to form a high-density structure in exemplary embodiment 3 of the present invention.
Figure 11:
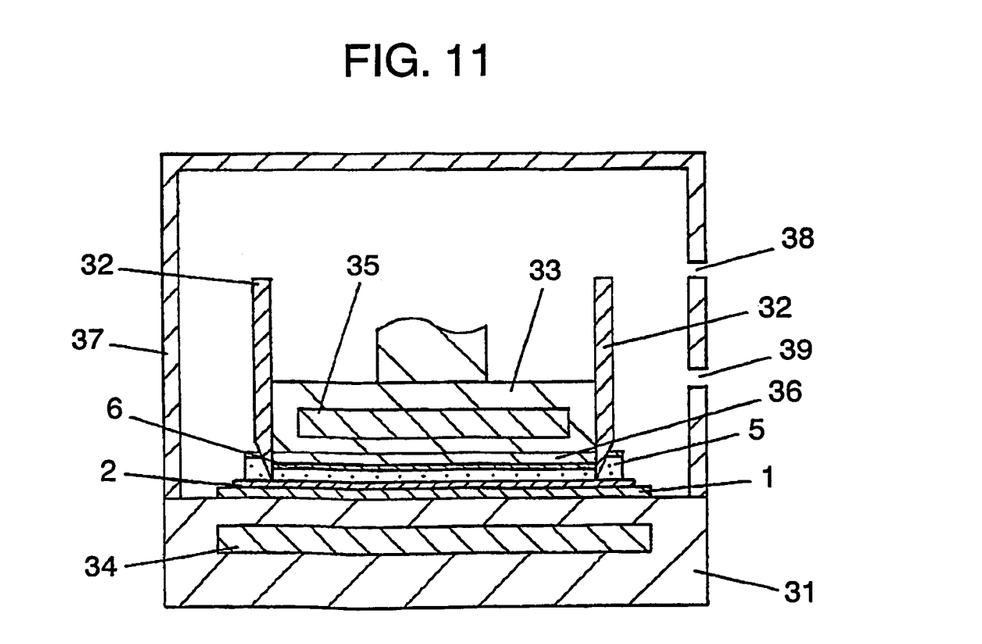
FIG. 11 is still another cross-sectional view for describing the step of applying a pressing force to a stack body to form a high-density structure in exemplary embodiment 3 of the present invention.

Next, as FIG. 10 shows, frame 32 is moved down by hydraulic pressure and pressed into stack body 5 and stops the motion of moving down at a position where the tip of frame 32 touches adhesive sheet 2. Thereafter, the pressing force of pressing force applying member 33 is increased by hydraulic pressure and stack body 5 inside of frame 32 is pressed as FIG. 11 shows. At this time, heaters 34 and 35 keep the temperatures of lower die 31 and pressing force applying member 33 at 80° C. and a pressing force of 30 MPa is applied to stack body 5 for 30 seconds.

Then, while the downward motion of pressing force applying member 33 is stopped, the hydraulic pressure is reduced to 1 MPa. While stack body 5 is being held down, frame 32 is moved up by hydraulic pressure to have frame 32 separated from stack body 5. Thereafter, pressing force applying member 33 is moved up by hydraulic pressure to be separated from stack body 5. And, air is introduced through air inlet 39 to return the pressure inside of vacuum chamber 37 to barometric pressure, and stack body 5 formed into a high-density structure by pressing is removed together with supporting plate 1 and adhesive sheet 2 from lower die 31 of the pressing force applying setup.

In the same way as in exemplary embodiment 1, stack body 5 is cut apart into pieces of green chips. The green chips are sintered, and are then provided with external electrodes, thus producing multilayer ceramic capacitors in exemplary embodiment 3 of the present invention By conducting an inspection of the internal structure of the multilayer ceramic capacitors produced in exemplary embodiment 2 through a microscopic observation of cross-sections of the capacitors, failures due to structural defects such as disconnection defects caused by displacement of conductive layers, delamination and the like are not observed at all. Electrical characteristics of the multilayer ceramic capacitors are also excellent.

With respect to a manufacturing method for manufacturing multilayer ceramic capacitors in exemplary embodiment 3 of the present invention, an application of a pressing force to stack body 5 under a reduced atmospheric pressure facilitates the elimination of gasses contained inside of stack body 5, thereby allowing the adhesion between ceramic green sheets to be achieved easily. Although the application of a pressing force to stack body 5 is conducted in a short period of time in exemplary embodiment 3 when compared with exemplary embodiment 2, such problems as deformed stack bodies are not observed and a very excellent high-density structure of the stack body is realized. As a result, ceramic electronic components exhibiting no failures due to disconnection defects, structural defects and defective electrical characteristics are produced with a good yield rate.

In addition, frame 32 is punched into stack body 5 by means of pressing force applying member 33 with stack body 5 held in place, and then a pressing force is applied to stack body 5 via pressing force applying member 33, thereby allowing stack body 5 to be fixed in position by means of pressing force applying member 33 and also to be prevented from being lifted or delaminated when the air inside of vacuum chamber 37 is exhausted to create the state of a reduction in atmospheric pressure. Even when frame 32 is punched into stack body 5, lifting or deformation of stack body 5 is not caused.

With respect to a method of stacking layers on top of each other to produce stack body 5 in exemplary embodiment 1 through exemplary embodiment 3, a description is given of a method comprising the steps of transferring by adhesion ceramic green sheet 3 onto adhesive sheet 2 on supporting plate 1 via a base film by applying heat and pressure and eliminating the base film by peeling off. The present invention is equally effective in the case of forming a high-density structure by applying a pressing force to a stack body, which is produced according to a stacking method different from the aforementioned transfer stacking method.

Although a description is given of preparations of multi-layer ceramic capacitors in exemplary embodiment 1 through exemplary embodiment 3, the present invention is equally effective in the case of producing a stack body formed by stacking ceramic green sheets and conductive layers on top of each other and used in ceramic electronic components such as multilayer coils, multilayer varistors, multilayer thermisters, ceramic multilayer substrates and the like.

INDUSTRIAL APPLICABILITY

As described above, the present invention deals with a manufacturing method for manufacturing ceramic electronic components, in which the process of forming a cladding structure by applying a pressing force to a stack body formed by stacking ceramic green sheets and conductive layers on top of each other comprises the steps of punching a frame into the stack body and keeping the frame in the stack body, and applying a pressing force to the stack body via a pressing force applying member located inside of the frame. According to this method, a pressing force can be applied to the stack body held and fixed in position by the frame in such a way that there are no gaps created at all between the frame and the peripheral side surfaces of the stack body. Therefore, even when a sufficiently strong pressing force is applied to the stack body to form a high-density structure, the stack body can be prevented from being deformed in the direction parallel to the surface thereof, thereby realizing a reduction in disconnection failures and also in performance failures. After the resulting stack bodies are sintered, ceramic electronic components free of structural defects and failures in electrical performance can be produced with an excellent yield rate by using the sintered bodies.

The present invention also deals with manufacturing equipment comprising a lower die, a pressing force applying member and a frame provided so as to surround the peripheral side surfaces of the pressing force applying member for the purpose of pressing an object to be pressed, in which the tip of the frame is shaped like a blade. By the use of the manufacturing equipment, a manufacturing method for manufacturing ceramic electronic components is made possible. This method comprises applying a pressing force to a stack body via a pressing force applying member located inside of a frame while the frame is punched into the stack body and kept therein.

The invention claimed is:

1. A manufacturing method for manufacturing ceramic electronic components, comprising:
    forming a stack body by stacking ceramic green sheets and conductive layers on top of each other;
    disposing the stack body between a frame and a die member;
    moving the frame toward the die member to cause the frame to punch into the stack body, and then holding the frame in the stack body;

locating a pressing force applying member inside the frame, the pressing force applying member and the frame being movable independently of each other; and while the frame is held in the stack body, applying a pressing force to a portion of the stack body located inside the frame by causing the pressing force applying member located inside the frame to press against the portion of the stack body located inside the frame, to thereby form a high-density structure inside the frame while preventing the high-density structure from deforming outwardly beyond the frame in a direction parallel to the surface of the high density structure.

2. The manufacturing method according to claim 1, further comprising while the frame is held in the stack body and the pressing force is applied to the portion of the stack body located inside the frame, heating the portion of the stack body located inside the frame.

3. The manufacturing method according to claim 1, further comprising placing the portion of the stack body located inside the frame under a reduced atmospheric pressure.

4. The manufacturing method according to claim 1, wherein prior to said punching of the frame into the stack body, the stack body is held by the pressing force applying member; and said applying of the pressing force to the portion of the stack body located inside the frame is carried out after said punching of the frame into the stack body.

5. The manufacturing method according to claim 1, wherein the frame includes a tip portion that constitutes a blade.

6. The manufacturing method according to claim 1, wherein said locating of the pressing force applying member inside the frame comprises locating the pressing force applying member inside the frame such that no gaps exist between the frame and the pressing force applying member.

7. The manufacturing method according to claim 1, wherein said locating of the pressing force applying member inside the frame comprises locating the pressing force applying member inside the frame such that inwardly-facing inner side surfaces of the frame extend to a tip of the frame in parallel with a side surface of the pressing force applying member.

8. The manufacturing method according to claim 1, further comprising providing the pressing force applying member with an elastic body arranged to press against the portion of the stack body located inside the frame.

9. The manufacturing method according to claim 1, wherein said die member is constituted by a lower die disposed beneath said frame.

10. The manufacturing method according to claim 1, wherein each of said die member and said pressing force applying member includes a heater.

11. The manufacturing method according to claim 1, wherein said die member includes a heater.

12. The manufacturing method according to claim 1, wherein said pressing force applying member includes a heater.

* * * * *